No. 749,498. Patented January 12, 1904.

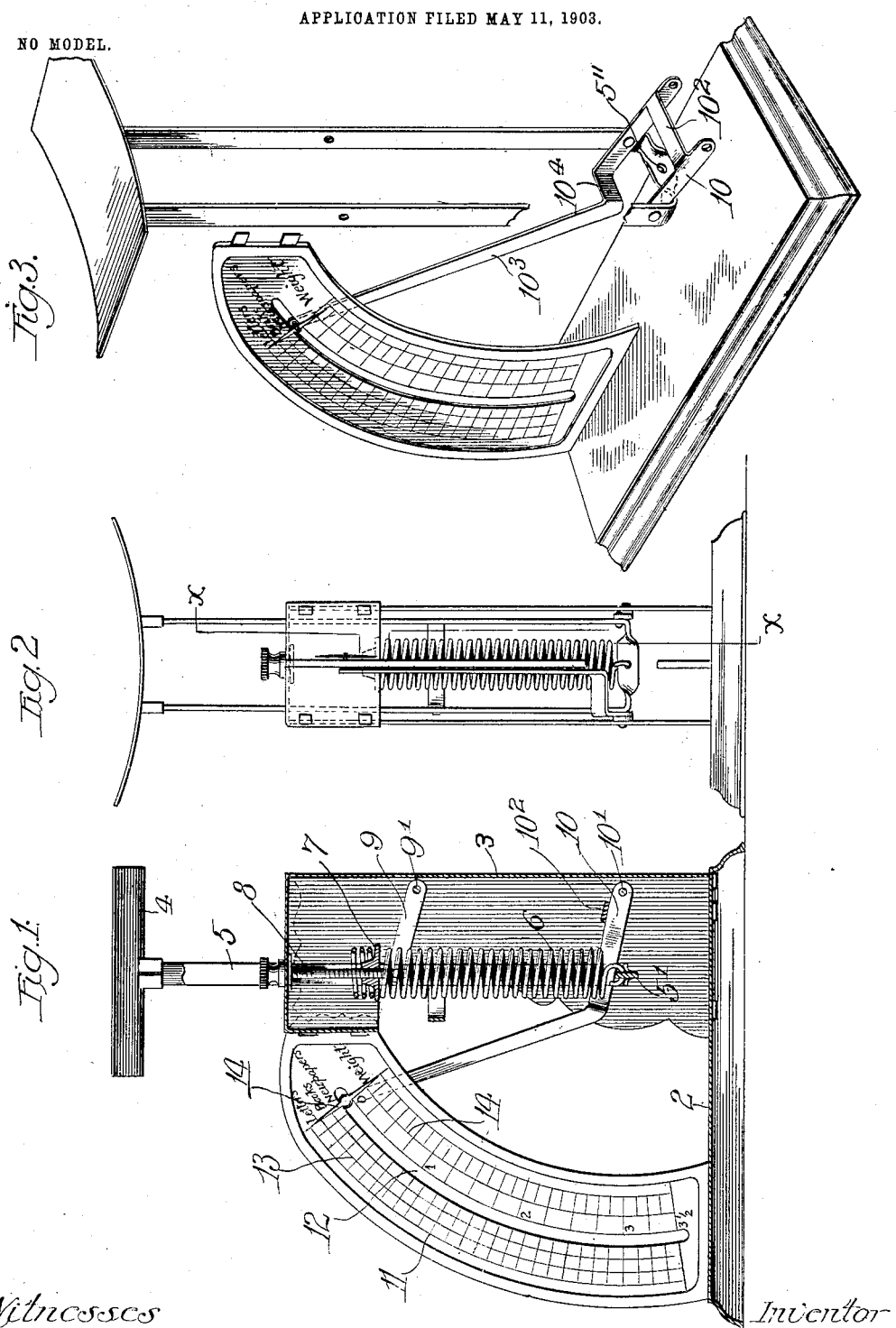

UNITED STATES PATENT OFFICE.

WILLIAM N. PELOUZE, OF CHICAGO, ILLINOIS.

WEIGHING-SCALE.

SPECIFICATION forming part of Letters Patent No. 749,498, dated January 12, 1904.

Application filed May 11, 1903. Serial No. 156,682. (No model.)

*To all whom it may concern:*

Be it known that I, WILLIAM N. PELOUZE, a citizen of the United States, residing at Chicago, in the county of Cook and State of Illinois, have invented a certain new, useful, and Improved Weighing-Scale, of which the following is a specification.

My invention relates to weighing-scales, and has particular reference to light portable postal scales.

The object of my invention is to provide a compact, light, durable, and reliable postal scale of pleasing appearance and so constructed that the scale indications may be easily and accurately observed or read.

The particular object of the invention is to improve and simplify postal scales of the class including that shown and described in Letters Patent to Gilfillan, No. 561,309, granted June 2, 1896. That scale is of special excellence by reason of the curved or cylindrical scale-plate and the double index or pointer therein employed. Said index starts at the top of the scale-plate and travels down as weights are placed upon the scale-pan. The greater number of letters, packages, &c., weighed upon such a device are of light weight and the scale graduations that are most frequently observed are therefore those at the top of the scale-plate, and as the pointer or index is normally elevated it is in the best possible position to facilitate the reading of the scale when the scale is in use upon a table or desk before the user. I find, however, that the Gilfillan scale and others of its class are too expensive to meet the popular demand; and the particular object of this invention is to provide a more simple and inexpensive postal scale that shall possess all the advantages of the more complex scales, including attractiveness in appearance.

With the foregoing objects in view my invention consists generally in a weighing-scale comprising a base, a scale-case thereon, and a scale mechanism mounted thereupon and having a pointer or index-arm adapted to sweep the arc of a circle, in combination with a scale-plate occupying a vertical plane substantially parallel with the movement plane of said arm and curved to conform to said arc, said plate having a curved middle slot that receives the index or pointer upon the arm.

My invention further consists in a novel combination pivot member and pointer-arm for the scale mechanism specially constructed and adapted for employment with the curved slotted scale-plate above mentioned; and, further, the invention consists in details of construction and in combinations of parts, all as hereinafter described, and particularly pointed out in the claims.

The invention will be more readily understood by reference to the accompanying drawings, forming a part of this specification, and in which—

Figure 1 is a side elevation of a weighing-scale embodying my invention, same being shown in section substantially on the irregular section-line *x x* of Fig. 2. Fig. 2 is a front or edge view of the scale; and Fig. 3 is a perspective view of the load or scale pan and post, the index or pointer-arm, and the curved scale-plate.

As shown in the drawings, 2 represents the base of the scale.

3 is the casing, column, or pillar containing the scale mechanism.

The scale-pan 4 is above the scale-case and is supported by the U-shaped load-post comprising the sides or legs 5 5, that are joined by the integral cross-bar 5'. The U-shaped post is made of strap metal and the cross portion 5' is bent or twisted into a vertical plane and provided with a hole 5" to receive the lower end of the scale-spring 6. The upper end of the scale-spring is fixed upon the gage nut or washer 7 on the lower end of the spring-adjusting screw 8. The load-post and scale-pan are thus supported by the balance-spring 6. The load-post plays through suitable openings in the top of the scale-case and is held in proper alinement by the parallel links or pivot members 9 and 10, pivoted thereon and upon the case 3.

9' and 10' are the pivot-points of the members 9 and 10 upon the case. The upper pivot member may comprise two separate links 9; but I prefer to make the lower pivot member 10 from a single piece of sheet metal. Thus, as shown in Fig. 3, the pivot member 10 comprises the short link portion upon one side and the long link portion on the other side, these being joined by the integral bar portion 10². The long portion of the member 10 extends forward beyond the load-post and is formed into the index or pointer-arm 10³. The load-post is thus pivoted at an intermediate point upon a pivot member that also constitutes the pointer-arm, and as the pull of the spring is upward the normal or rest point of the index end of the arm is at the top of the scale-plate 11. The scale-plate 11 is placed to one side or in front of the scale-case and occupies a vertical plane that is perpendicular to the plane including the two sides of the U-shaped load-post. This scale-plate is curved to conform to the arc of the circle that is described by the end of the pointer-arm when moved by the depression of the scale-pan. The lower end of the scale-plate is fastened upon the base 2, while the upper end is secured to the top of the scale-case 3.

12 is the pointer-slot that is provided in the scale-plate and which conforms to the arc or sweep of the pointer-arm. Distinct sets of graduations or scale-marks 13 and 14 are provided on opposite sides of the curved slot 12, the lower or inner set being preferably the marks for pounds and ounces, while the upper set of marks are money graduations corresponding to the postage rates for different classes of mail-matter. The pointer-arm is provided with the forward bend 10⁴, adjacent to the load-post, and the free end of the arm therefore stands close to the rear side of the scale-plate. The extreme end of the pointer-arm 10³ has a pin or bent end which extends through the slot 12 and carries the double pointer or index 14. Each set of graduations is thus provided with an index-point. The normal position of said index-point is at the upper end of the scale-plate, opposite the zero-marks thereon, and is brought into exact register therewith by means of the adjusting-screw 7. A letter or other object placed upon the load-pan depresses it against the tension of the spring 6 and correspondingly depresses the index-points, indicating the weight and the amount of postage required upon the scale-plate.

The construction of my scale-plate is so simple that it may be manufactured at much less cost than other scales and sold at a price that places it within the reach of all purchasers of such devices. At the same time none of the advantages of the more expensive scales is sacrificed.

Having thus described my invention, I claim as new and desire to secure by Letters Patent—

1. A weighing-scale, comprising a suitable frame, in combination, with a load-post, a balance-spring, two parallel pivot members connecting said load-post and frame, one of said pivot members being provided with an integral pointer-arm, a curved scale-plate and a double index or point on said arm, substantially as described.

2. A weighing-scale, comprising a suitable frame, in combination with a load-post, a balance-spring connected with said post, pivot members connecting said post and frame, a pointer-arm integral with one of said members, a vertical scale-plate having a curved slot which conforms to the sweep of said pointer and an index attached to said arm and movable in said slot, substantially as described.

3. A weighing-scale, comprising a suitable base, in combination, with a scale-case on one end of said base, a vertical scale-plate on the opposite end of said base and having its upper end attached to said case, said plate being provided with a curved slot and with two sets of graduations, a balance-spring in said case, a load-post comprising two parallel members supported by said spring and provided with a load-pan, parallel pivot members 9 and 10 connecting said post and case, the lower pivot member being provided with an integral, outwardly-bent pointer-arm and a double index or pointer connected with said arm through said slot, substantially as described.

4. The integral pivot member and pointer-arm for postal scales, comprising the link portions joined by the integral bar 10², and the bent arm 10³ integral with one of said link portions, substantially as described.

5. In a weighing-scale, the load-post, comprising parallel sides, connected by an integral cross-piece, in combination with the two-sided link, 10, connected by the integral cross-piece, 10², and bent to form the index-arm, 10³, substantially as described.

6. A weighing-scale, comprising the base, 2, the load-post, 5, the pivot-arms, 9, the pivot-link, 10, the index-arm, 10³, the scale-plate, 11, having the curved-slot, 12, attached to the base, the scale-frame, 3, and the double pointers, 14, movable in the slot, 12, in the scale-plate, 11, substantially as described.

7. A load-post for postal scales, comprising flat, parallel sides, bent in U shape to form the integral cross-piece at the bottom, said cross-piece being twisted to form a portion in a plane at right-angles with the planes of the upright sides, 5', and provided with a perforation, 5", substantially as described.

8. In a weighing-scale, a suitable base, in combination with the frame erected thereon and provided with an open front, a curved scale-plate having its lower end attached to said base and its upper end attached to the upper part and front of said scale-case, said scale-plate being provided with a curved slot and with two sets of graduations, the scale mechanism arranged in said case, and a pointer-arm extending therefrom through the open front of said case, and having an index that sweeps said slot, substantially as described.

9. In a weighing-scale, a base, in combination with a case erected thereon, a load-post arranged therein, a balance-spring in said case, suitable links for said load-post, a pointer-arm movable with the load-post, said case having an open front through which said arm is adapted to swing, a curved scale-plate having its lower end attached to the base and having its upper end attached to said case, said plate being provided with a curved slot and with graduations, and a double index on said pointer-arm and occupying said slot, to move therein, substantially as described.

10. In a weighing-scale, a suitable base, in combination with a scale-case erected thereon and provided with an open front, a U-shaped load-post arranged in said case, a balance-spring, the links connecting said load-post and case, a pointer-arm extending from one of said links, a curved scale-plate occupying a vertical plane midway of said case, said plate being provided with a curved slot and having its lower end attached to said base and its upper end attached to said case, and said pointer-arm being bent to occupy substantially the planes of said plate and being provided with an index extending through the slot of said plate, substantially as described.

In testimony whereof I have hereunto set my hand, this 6th day of May, 1903, at Chicago, Illinois, in the presence of two witnesses.

WILLIAM N. PELOUZE.

Witnesses:
C. G. HAWLEY,
JOHN H. GARNSEY.